United States Patent
Du et al.

(10) Patent No.: US 10,642,481 B2
(45) Date of Patent: May 5, 2020

(54) GESTURE-BASED INTERACTION METHOD AND INTERACTION APPARATUS, AND USER EQUIPMENT

(71) Applicant: Beijing Zhigu Rui Tuo Tech Co., Ltd., Beijing (CN)

(72) Inventors: Lin Du, Beijing (CN); Ying Hu, Changsha (CN)

(73) Assignee: BEIJING ZHIGU RUI TUO TECH CO., LTD., Beijing (CN)

(*) Notice: Subject to any disclaimer, the term of this patent is extended or adjusted under 35 U.S.C. 154(b) by 253 days.

(21) Appl. No.: 15/234,037

(22) Filed: Aug. 11, 2016

(65) Prior Publication Data
US 2017/0052694 A1  Feb. 23, 2017

(30) Foreign Application Priority Data

Aug. 21, 2015 (CN) .......................... 2015 1 0519874

(51) Int. Cl.
*G06F 3/0354* (2013.01)
*G06F 3/0488* (2013.01)
*G06F 3/0484* (2013.01)
*G06F 3/01* (2006.01)

(52) U.S. Cl.
CPC ............ *G06F 3/04883* (2013.01); *G06F 3/01* (2013.01); *G06F 3/03547* (2013.01); *G06F 3/0484* (2013.01); *G06F 3/0488* (2013.01); *G06F 3/04845* (2013.01); *G06F 2203/04808* (2013.01)

(58) Field of Classification Search
CPC .... G06F 3/0412; G06F 3/0418; G06F 3/0482; G06F 3/04845; G06F 3/04883; G06F 2203/04104; G06F 3/01; G06F 3/0488; G06F 3/041; G06F 3/0484; G06F 3/03547
See application file for complete search history.

(56) References Cited

U.S. PATENT DOCUMENTS 7,840,912 B2 * 11/2010 Elias .................... G06F 3/04883
715/863
9,552,154 B2 * 1/2017 Park ..................... G06F 3/0416
(Continued)

FOREIGN PATENT DOCUMENTS

CN          101727240 A      6/2010
CN          102341776 A      2/2012
(Continued)

*Primary Examiner* — Shen Shiau
(74) *Attorney, Agent, or Firm* — Sheppard Mullin Richter & Hampton LLP

(57) ABSTRACT

Embodiments of the present application disclose a gesture-based interaction method and interaction apparatus, and a user equipment. The method comprising: acquiring touch information corresponding to a touch event on a touch sensing surface; and in response to that determining the touch event according to the touch information meets at least one set condition, performing an operation corresponding to the touch event, wherein the at least one set condition comprises: a first touch by a first finger on the touch sensing surface comprises a fingertip touch and a finger joint touch that occur in order. Technical solutions of the embodiments of the present application enrich a manner for interacting with an electronic device having a touch sensing surface.

8 Claims, 9 Drawing Sheets

(56) References Cited

U.S. PATENT DOCUMENTS

| | | | | |
|---|---|---|---|---|
| 2007/0177803 A1* | 8/2007 | Elias | G06F 3/04883 | 382/188 |
| 2007/0177804 A1* | 8/2007 | Elias | G06F 3/04883 | 382/188 |
| 2010/0053111 A1* | 3/2010 | Karlsson | G06F 3/04883 | 345/174 |
| 2010/0110031 A1* | 5/2010 | Miyazawa | G06F 3/0488 | 345/173 |
| 2010/0127997 A1* | 5/2010 | Park | G06F 3/0416 | 345/173 |
| 2010/0178873 A1* | 7/2010 | Lee | H04M 1/7253 | 455/41.3 |
| 2010/0299638 A1* | 11/2010 | Choi | G06F 3/04883 | 715/835 |
| 2011/0029934 A1* | 2/2011 | Locker | G06F 3/04883 | 715/863 |
| 2011/0304584 A1* | 12/2011 | Hwang | G06F 3/04845 | 345/174 |
| 2011/0310049 A1 | 12/2011 | Homma et al. | | |
| 2011/0310058 A1* | 12/2011 | Yamada | G06F 3/0488 | 345/174 |
| 2012/0019562 A1* | 1/2012 | Park | G06F 3/0488 | 345/657 |
| 2012/0293432 A1* | 11/2012 | Wu | G06F 3/0383 | 345/173 |
| 2012/0327009 A1* | 12/2012 | Fleizach | G06F 3/04883 | 345/173 |
| 2014/0184537 A1 | 7/2014 | Hsu et al. | | |
| 2014/0317498 A1* | 10/2014 | Okumura | G06F 3/016 | 715/702 |
| 2016/0162058 A1* | 6/2016 | You | G06F 3/03547 | 345/157 |
| 2016/0202898 A1* | 7/2016 | Bostick | G06F 16/26 | 345/173 |

FOREIGN PATENT DOCUMENTS

| | | |
|---|---|---|
| CN | 103809840 A | 5/2014 |
| CN | 103902080 A | 7/2014 |

* cited by examiner

GESTURE-BASED INTERACTION METHOD AND INTERACTION APPARATUS, AND USER EQUIPMENT

TECHNICAL FIELD

The present application relates to the field of man-machine interaction technologies, and in particular, to a gesture-based interaction method and interaction apparatus, and a user equipment.

BACKGROUND

With development of touch sensing technologies, especially with wide use of electronic devices having touch sensing surfaces, touch-based man-machine interaction means are more diversified. For example, different operations are implemented by defining different touch gestures, which greatly facilitates control by a user on electronic devices by using a touch panel. Some touch gestures are widely used because the touch gestures comply with natural usage habits of a user, for example, a gesture that two fingers touch a screen and move close to each other corresponds to zooming out.

SUMMARY

A possible objective of embodiments of the present application is: providing a gesture-based interaction solution.

According to a first aspect, a possible implementation solution of the present application provides a gesture-based interaction method, comprising:

acquiring touch information corresponding to a touch event on a touch sensing surface; and in response to that determining the touch event according to the touch information meets at least one set condition, performing an operation corresponding to the touch event, wherein the at least one set condition comprises: a first touch by a first finger on the touch sensing surface comprises a fingertip touch and a finger joint touch that occur in order.

According to a second aspect, a possible implementation solution of the present application provides a gesture-based interaction apparatus, comprising:

an information acquiring module, configured to acquire touch information corresponding to a touch event on a touch sensing surface; and a processing performing module, configured to: in response to that determining the touch event according to the touch information meets at least one set condition, perform an operation corresponding to the touch event, wherein the at least one set condition comprises: a first touch by a first finger on the touch sensing surface comprises a fingertip touch and a finger joint touch that occur in order.

According to a third aspect, a possible implementation solution of the present application provides a user equipment, wherein the user equipment comprises:

a memory, configured to store a program; and a processor, configured to execute the program stored by the memory, wherein the program enables the processor to perform the following operations:

acquiring touch information corresponding to a touch event on a touch sensing surface; and in response to that determining the touch event according to the touch information meets at least one set condition, performing an operation corresponding to the touch event, wherein the at least one set condition comprises: a first touch by a first finger on the touch sensing surface comprises a fingertip touch and a finger joint touch that occur in order.

According to at least one implementation solution of the embodiments of the present application, an operation intention of a user is identified by detecting a fingertip touch and a finger joint touch that occur in order and that are comprised in a touch by a finger of the user on a touch sensing surface, which enriches a manner for interacting with an electronic device having a touch sensing surface.

DETAILED DESCRIPTION

Figure 1:
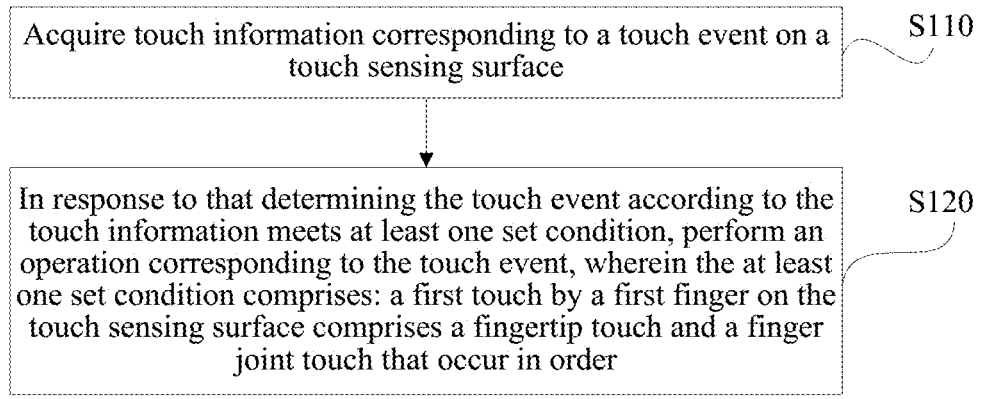
FIG. 1 is a flowchart of a gesture-based interaction method according to an embodiment of the present application.

Specific implementation manners of the present application are further described in detail below with reference to the accompanying drawings (in which like elements are denoted by like reference numerals) and embodiments. The following embodiments are intended to describe the present application, but not to limit the scope of the present application.

A person skilled in the art may understand that the terms such as "first" and "second" in the present application are used only to differentiate different steps, devices, modules, or the like, and neither represent any specific technical meaning, nor indicate any logical order between the terms.

As shown in FIG. 1, an embodiment of the present application provides a gesture-based interaction method, comprising:

S110: Acquire touch information corresponding to a touch event on a touch sensing surface.

S120: In response to that determining the touch event according to the touch information meets at least one set condition, perform an operation corresponding to the touch event, wherein the at least one set condition comprises: a first touch by a first finger on the touch sensing surface comprises a fingertip touch and a finger joint touch that occur in order.

For example, as an execution body of this embodiment, a gesture-based interaction apparatus provided in the present application performs S110 and S120. Specifically, the gesture-based interaction apparatus may be disposed in a user equipment in a manner of software, hardware, or a combination of software and hardware, or the gesture-based interaction apparatus is a user equipment, wherein the user equipment comprises, but not limited to, an electronic device, such as a smartphone, a tablet computer, or a notebook computer.

According to an implementation manner of this embodiment of the present application, an operation intention of a user is identified by detecting a fingertip touch and a finger joint touch that occur in order and that are comprised in a touch by a finger of the user on a touch sensing surface, which enriches a manner for interacting with an electronic device having a touch sensing surface.

Steps of this embodiment of the present application are further described by using the following implementation manners.

S110: Acquire touch information corresponding to a touch event on a touch sensing surface.

In this embodiment, in response to a touch from a user, the touch sensing surface generates corresponding touch information, such as current information or voltage information.

In a possible implementation manner, the touch sensing surface is a surface of a touch display; or in a possible implementation manner, the touch sensing surface is a surface of a touch pad.

In a possible implementation manner, an execution body of the interaction method comprises the touch sensing surface, and S110 may comprise: collecting the touch information by using the touch sensing surface.

In another possible implementation manner, an execution body of the interaction method does not comprise the touch sensing surface, and S110 may comprise: acquiring the touch information from at least one external device in a communication method. For example, the touch information is acquired from a device comprising a touch sensing surface.

S120: In response to that determining the touch event according to the touch information meets at least one set condition, perform an operation corresponding to the touch event.

In this implementation manner, the at least one set condition comprises: a first touch by a first finger on the touch sensing surface comprises a fingertip touch and a finger joint touch that occur in order.

The first touch is a touch by the first finger on the touch sensing surface. In a process of the first touch, the first finger is basically in contact with the touch sensing surface all the time. That is, in the process of the first touch, the first finger is in contact with the touch sensing surface all the time; or a contact interruption time is within a set time interval that is very short, for example, within 0.2 second.

In this implementation manner, the fingertip touch is that a fingertip of the first finger comes into contact with the touch sensing surface. The finger joint touch is that a finger joint of the first finger comes into contact with the touch sensing surface.

In a possible implementation manner, optionally, the order comprises: the fingertip touch first occurs, and the finger joint touch then occurs.

Figure 2A:
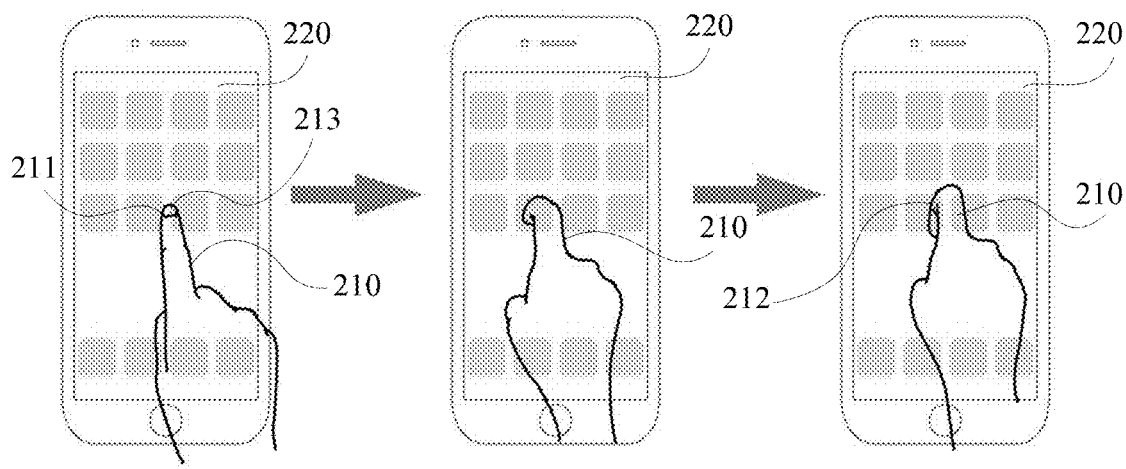
FIG. 2a and FIG. 2b are respectively schematic diagrams of two gestures corresponding to an interaction method according to an embodiment of the present application.

In this implementation manner, the touch event meets the at least one set condition, and when the touch event corresponds to actions of a user, the actions may be: as shown in FIG. 2a, a fingertip 211 of a first finger 210 of the user first comes into contact with a touch sensing surface 220, a finger joint of the first finger 210 then bends to a side of the center of a palm, and after gradual transition, a first finger joint 212 comes into contact with the touch sensing surface 220 (wherein an action of the first finger may be an action of crooking a finger). In this process, for example, a fingernail touch, that is, a fingernail 213 of the first finger 210 comes into contact with the touch sensing surface 220, between the fingertip touch and the finger joint touch may be further comprised.

In another possible implementation manner, optionally, the order comprises: the finger joint touch first occurs, and the fingertip touch then occurs.

Figure 2B:
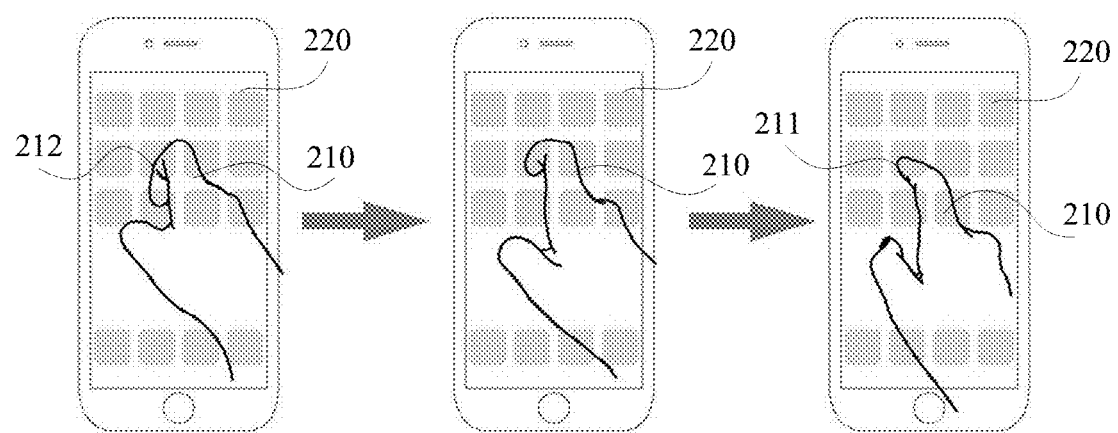

In this implementation manner, the touch event meets the at least one set condition, and when the touch event corresponds to actions of a user, the actions may be: as shown in FIG. 2b, a finger joint of a first finger 210 of the user is in a state of bending to a side of the center of a palm, a first finger joint 212 is in contact with a touch sensing surface 220, the first finger 210 then turns from a bending state to a straight state, and the first finger 210 comes into contact with the touch sensing surface 220 by using the first joint 212 that gradually turns into a fingertip 211 (wherein an action of the first finger may be an action of flicking a finger). In this process, for example, a fingernail touch between the finger joint touch and the fingertip touch may be further comprised. It may be seen that, in this implementation manner, the gesture of the user is just opposite to that in the previous implementation manner.

It can be seen according to the foregoing descriptions that, in the foregoing implementation manners of this embodiment of the present invention, a gesture of a user is an action that can be naturally made by the user but that is generally not made through a misoperation. Therefore, this embodiment of the present application provides a natural man-machine interaction method with a low misoperation possibility.

A person skilled in the art may learn that, in this embodiment of the present application, any operation needed by a user may be defined according to the touch event.

In a possible implementation manner, optionally, the operation comprises: an operation of pulling an object having a pulling direction corresponding to a moving direction of the first touch.

In this implementation manner, the moving direction of the first touch is, for example, a moving direction of a touch track corresponding to the first touch.

In this implementation manner, the object may be an object, such as a menu, a page, or an icon, that can be pulled.

Figure 3A:
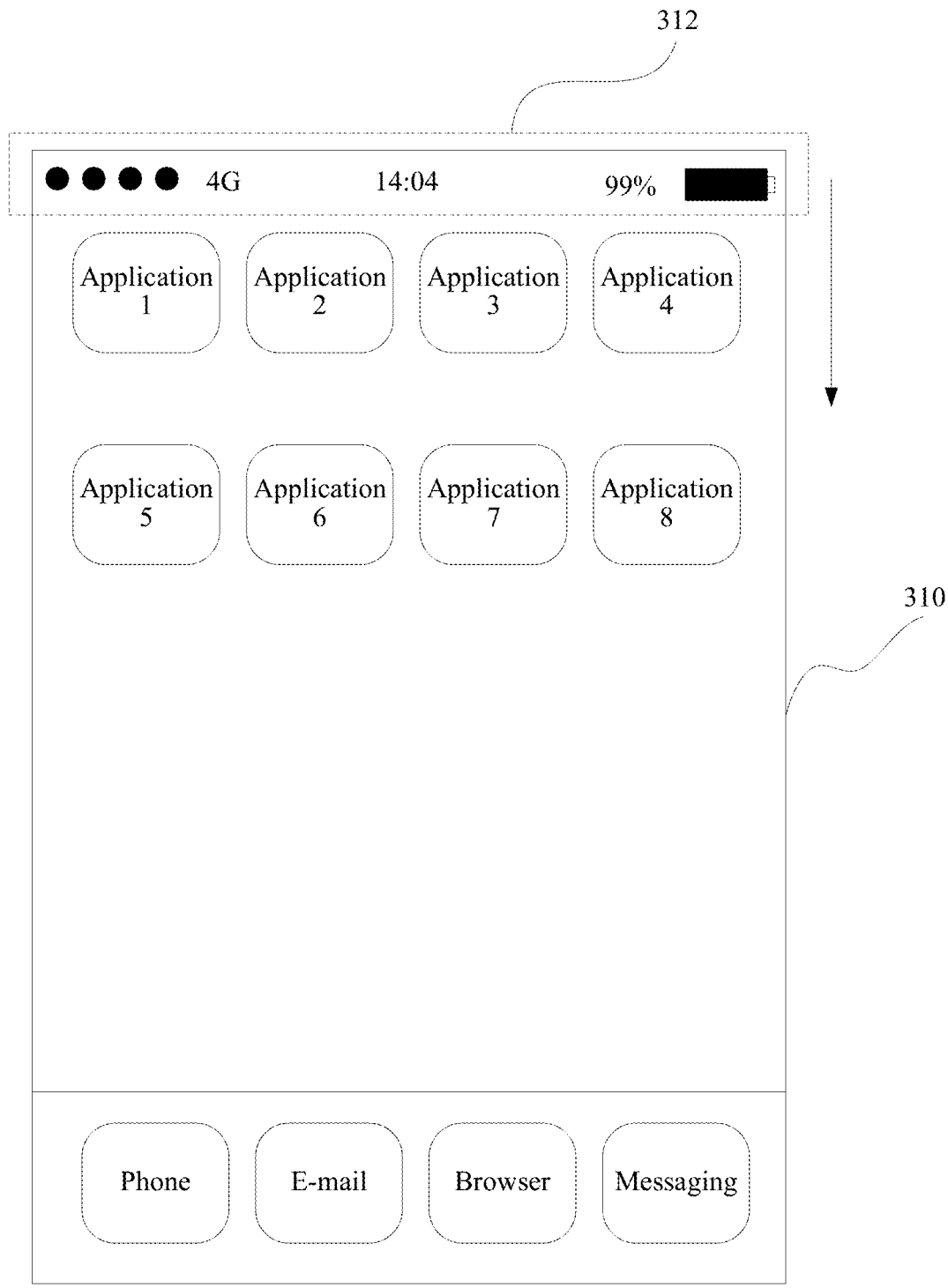
FIG. 3a and FIG. 3b are schematic diagrams of application scenarios of an interaction method according to an embodiment of the present application.
Figure 3B:
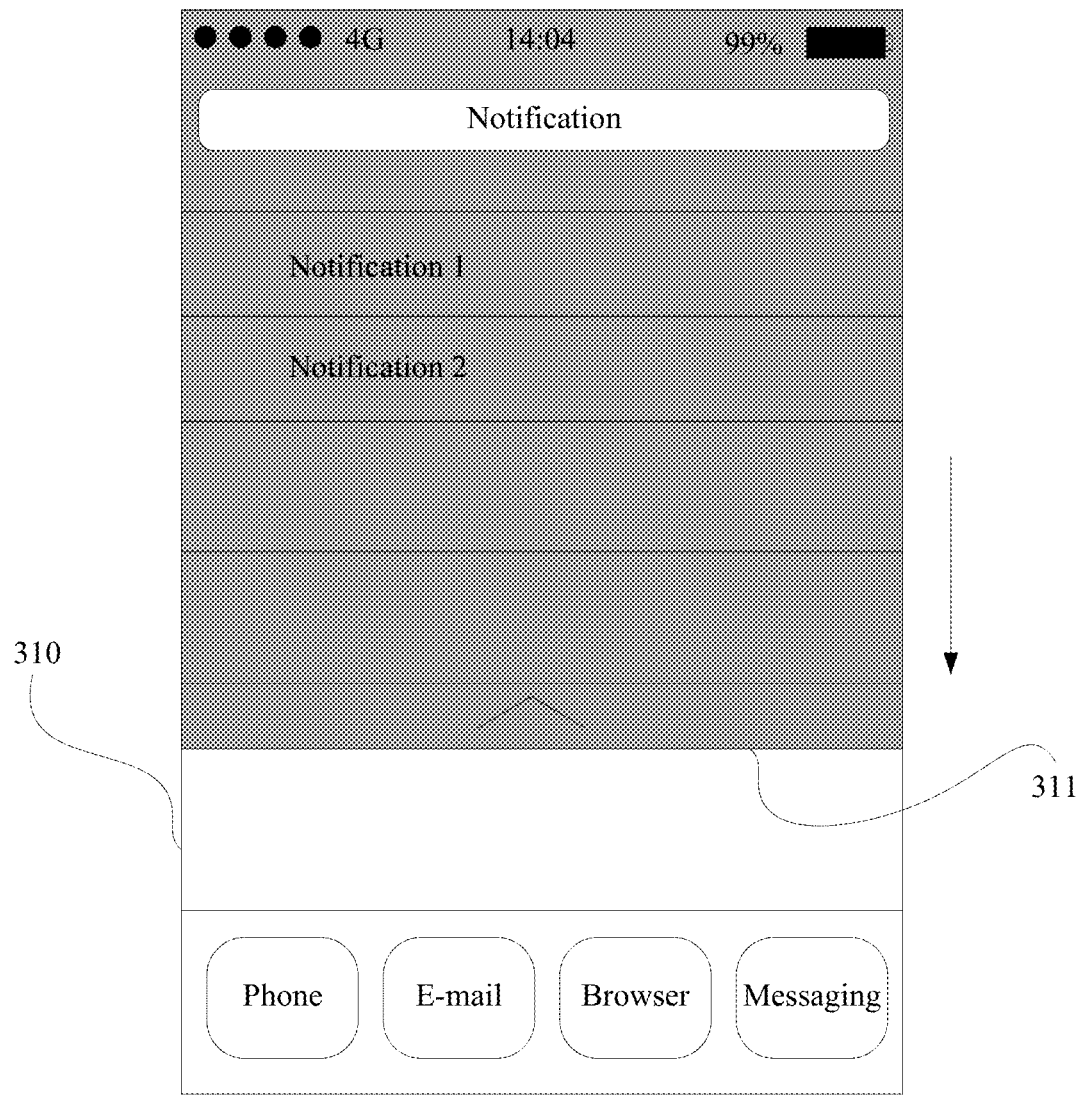

In a possible implementation manner, optionally, the object may be a preset object corresponding to the touch event. For example, in a possible application scenario, as shown in FIG. 3, the touch sensing surface is a touch display 310 of a mobile phone, and the object is a drop-down menu 311 in an interaction interface in an operating system of the mobile phone. When the drop-down menu 311 is not used, the drop-down menu 311 is in a hidden state. After a triggering gesture of a user is detected, the drop-down menu 311 is displayed at an upper part of a page with at least a part covered. The drop-down menu 311 may be, for example, a notification menu that provides a user with a system notification or that is provided by an application, or an operation center menu that is used to conveniently set multiple functions of the mobile phone, or certainly, may be a drop-down menu 311 having another function.

In some other implementation manners, whether the drop-down menu 311 is displayed may be determined by detecting that a finger of the user touches the touch display 310 in a set operation area 312 and presents a gesture of gliding down. However, to avoid a misoperation, the set operation area 312 is often set at a very small location at an upper part of the touch display 310. On some mobile phones with large touch displays, it is often not convenient to implement such an operation.

In a possible implementation manner of this embodiment of the present application, drop-down display of the drop-down menu 311 may be triggered by using a triggering event meeting the at least one set condition. In this implementation manner, for example, the first touch is associated with display of the drop-down menu 311, that is, the user makes a gesture, which corresponds to the first touch, at any location of the touch display 310, and the first finger moves downward. In this way, the drop-down display of the drop-down menu 311 may be triggered.

Alternatively, in a possible implementation manner, the object may be determined according to information, for example, a touch location of the first touch. For example, in a possible implementation manner, the object may be determined according to an object corresponding to an initial touch location of the first touch.

In another possible implementation manner, for example, when the order is that the finger joint touch first occurs, and the fingertip touch then occurs, the operation may comprise, for example: an operation of removing an object having a removal direction corresponding to a moving direction of the first touch.

The object removal operation described herein may be, for example, removing an object from an object set, for example, removing a file in a folder from the folder; deleting information about a contact from a contact list; and the like. The object may be an object corresponding to the initial touch location of the first touch.

Compared with an operation, for example, of long pressing an object to select the object, and then dragging the object to move the object from a range of the object set, the object removal operation is more natural and more convenient.

It can be seen according to the foregoing descriptions that, in this embodiment of the present application, an object pulling operation and an object removal operation of removing an object are triggered by using the triggering event described above, which better complies with a natural usage habit of a user, is easy to operate, and is not easy to falsely trigger.

Certainly, a person skilled in the art may learn that only several possible operations corresponding to the triggering event are listed above, and according to a design requirement, another possible operation may also be applied to the implementation manners of the present application, and are not listed one by one herein.

It indicates by using the following implementation manners that multi-touch is applied to the method in this embodiment of the present application to trigger an application scenario of a corresponding operation.

Optionally, in a possible implementation manner, the at least one condition further comprises:

at least one second touch respectively by at least one second finger on the touch sensing surface exists, and the at least one second touch overlaps with the first touch in term of time.

The overlapping herein may be complete overlapping or may be partial overlapping. For example, the at least one second touch exists within a time between the fingertip touch and the finger joint touch of the first touch.

In the following implementation manners, an example in which the at least one second touch is a second touch is used for description.

In an implementation manner in which the order comprises: the fingertip touch first occurs, and the finger joint touch then occurs, the first touch and the second touch may correspond to an action of performing "twisting" by a user on the touch sensing surface by using a forefinger and a thumb.

In a possible implementation manner, it may be further determined according to a rotation track corresponding to the first touch that the first touch and the second touch correspond to the action of "twisting". Therefore, in this implementation manner, the at least one condition may further comprise:

the first touch corresponds to a first rotation track.

For example, a location at which the second finger is in contact with the touch sensing surface basically does not change, and the first finger performs the action of "twisting" by means of movement in a rotation radian.

Alternatively, further, the at least one condition may further comprise: the at least one second touch respectively corresponds to at least one second rotation track, wherein a rotation direction of the first rotation track is consistent with a rotation direction of the second rotation track.

In this implementation manner, the first finger and the second finger simultaneously rotate to one direction (for example, clockwise), to perform the action of "twisting".

Figure 4:
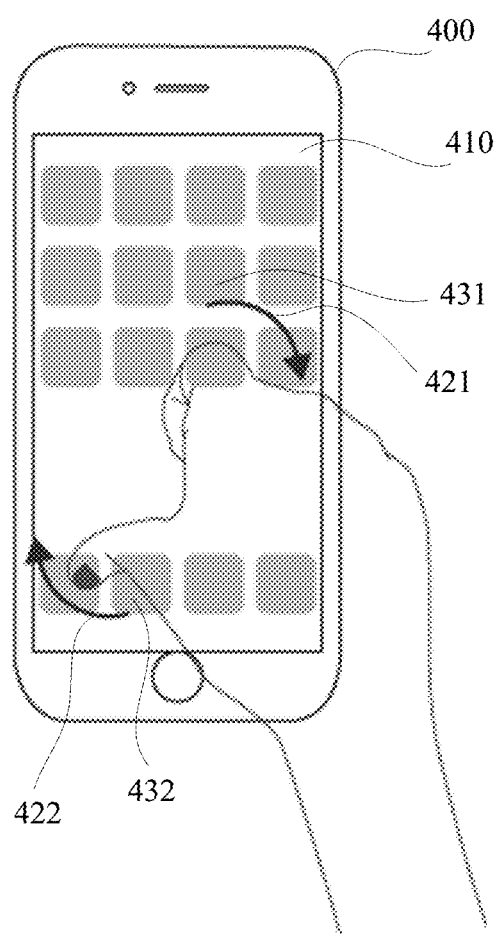
FIG. 4 is a schematic diagram of another application scenario of an interaction method according to an embodiment of the present application.

As shown in FIG. 4, a forefinger (that is, the first finger) and a thumb (that is, the second finger) of the user respectively moves on a touch display 410 of a mobile phone 400 according to a first rotation track 421 and a second rotation track 422, to perform the touch event.

A person skilled in the art may learn that according to settings, the touch event corresponding to the multi-touch described above may be used to trigger many operations.

For example, in a possible implementation manner, the operation comprises:

an operation of associating a first object corresponding to the first touch with at least one second object respectively corresponding to the at least one second touch.

In a possible implementation manner, the first object may be determined according to an initial touch location of the first touch; and the second object may be determined according to an initial touch location of the second touch.

For example, in an implementation manner shown in FIG. 4, the initial touch location (that is, a start location of the first rotation track 421) of the first touch falls on a first icon 431 corresponding to a first application; the initial touch location (that is, a start location of the second rotation track 422) of the second touch fall on a second icon 432 corresponding to a second application. Therefore, according to this implementation manner, it may be determined that the first application is the first object and the second application is the second object.

Certainly, in another possible implementation manner, a first object corresponding to the first touch and a second object corresponding to the second touch may be determined in a preset manner.

The operation of associating the first object with the second object may be any one of possible operations of associating two objects. For example, the operations of associating two objects may be:

1. data transmission between two objects, for example, data sharing between two applications corresponding to two icons and data sharing between two devices corresponding to two icons;

2. establishing a connection between two objects, for example, establishing a communication connection between two devices corresponding to two icons; and 3. classifying two objects into a same object set, for example, combining two icons into one icon folder.

Certainly, the operations of associating two objects may be further performed in another manner, which is not listed one by one herein again.

Because the action of "twisting" is generally performed by a user on an occasion in which multiple objects need to be aggregated together, using the touch event described above to perform the operation of associating multiple objects complies with a natural usage habit of the user, facilitating memorizing and use of the user.

In an implementation manner in which the order comprises: the finger joint touch first occurs, and the fingertip touch then occurs, the first touch and the second touch may correspond to an action of performing "reverse twisting" by a user on the touch sensing surface by using a forefinger and a thumb.

In this implementation manner, the at least one condition may further comprise:

the first touch corresponds to a first rotation track.

For example, a location at which the second finger is in contact with the touch sensing surface basically does not change, and the first finger performs the action of "reverse twisting" by means of movement in a rotation radian.

Alternatively, further, the at least one condition may further comprise: the second touch separately corresponds to a second rotation track, wherein a rotation direction of the first rotation track is consistent with a rotation direction of the second rotation track.

In this implementation manner, the first finger and the second finger simultaneously rotate to one direction (the direction is generally opposite to the direction corresponding to the action of "twisting", for example, when the action of "twisting" is clockwise, the action of "reverse twisting" is anti-clockwise), to perform the action of "reverse twisting".

The action of "twisting" corresponds to the operation of associating two objects, and in a possible implementation manner, when the touch event corresponds to the foregoing action of "reverse twisting", the operation may comprise: an operation of disassociating at least two associated objects corresponding to the first touch and the second touch.

In this implementation manner, the disassociation operation may correspond to the association of the at least two associated objects. For example, when the association is data transmission, the disassociation may be ending data transmission; when the association is establishing a connection, the disassociation may be disrupting a connection; when the association is combining multiple icons into a same icon folder, the disassociation may be de-aggregating the multiple icons in the icon folder.

In a possible implementation manner, optionally, the at least two associated objects may be determined according to an initial touch location corresponding to the second touch.

For example, in a possible implementation manner, a first application is associated with a second application, a thumb of a user is initially placed on the first application or the second application, and the action of "reverse twisting" is then performed; therefore, an operation of disassociating the first application from the second application according to the touch event corresponding to the action of "reverse twisting".

Similarly, because the action of "reverse twisting" is generally performed by the user on an occasion in which multiple objects aggregated together need to be de-aggregated, using the touch event described above to perform the operation of de-associating multiple associated objects complies with a natural usage habit of the user, facilitating memorizing and use of the user.

In a possible implementation manner, the action of "twisting" and the action of "reverse twisting" are also consistent with an action of twisting a knob. Therefore, in this implementation manner, optionally, the operation may comprise:

enabling or disabling at least one function.

For example, the touch event corresponding to the action of "twisting" triggers an operation of enabling at least one function, and the touch event corresponding to the action of "reverse twisting" triggers an operation of disabling at least one function.

In a possible implementation manner, the at least one function may be determined according to presettings.

For example, the action of "twisting" is used on an icon of an application, which corresponds to an operation of enabling the application.

The action of "reverse twisting" is used on an interaction interface of an application, which corresponds to an operation of disabling the application.

Alternatively, the action of "twisting" or "reverse twisting" is used on any display interface of an electronic device, which corresponds to an operation of turning off the electronic device.

It may be seen according to the foregoing descriptions that using the touch event described above to perform the operation of enabling or disabling the at least one function also complies with a natural usage habit of the user, facilitating memorizing and use of the user.

A person skilled in the art may learn that some operations that can be triggered by touch events meeting at least one set condition in this embodiment of the present application are merely listed above exemplarily, and a touch event in this embodiment of the present application may be further used to trigger another possible operation. For example, because the action of "twisting" and the action of "reverse twisting" are consistent with an action of twisting a knob, the operation may be further an operation of adjusting a parameter. For example, the action of "twisting" corresponds to increasing a parameter (for example, volume), and the action of "reverse twisting" corresponds to reducing a parameter.

A person skilled in the art may understand that in the foregoing method in specific implementation manners of the present application, the value of the serial number of each step does not mean an execution sequence, and the execution sequence of each step should be determined according to the function and internal logic thereof, and should not be any limitation on the implementation procedure of the specific implementation manners of the present application.

Figure 5:
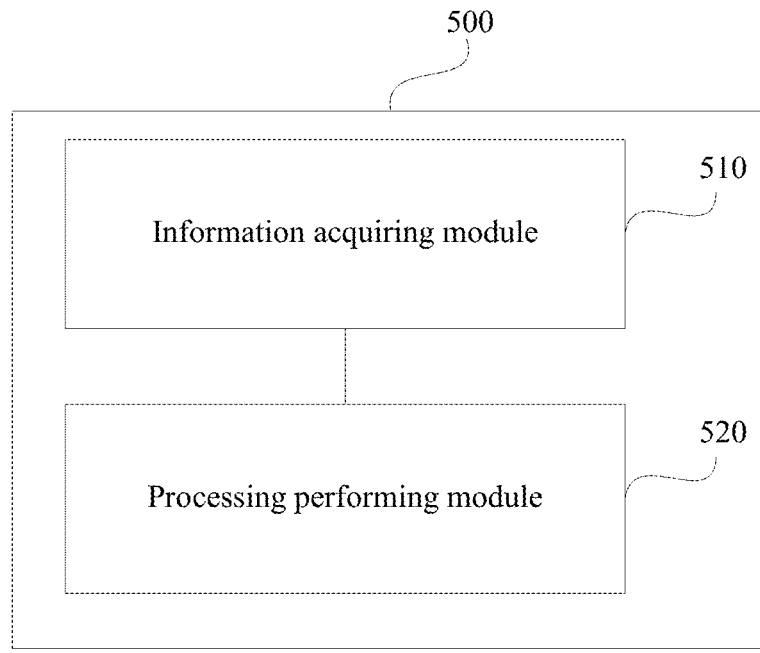
FIG. 5 is a schematic block diagram of a structure of a gesture-based interaction apparatus according to an embodiment of the present application.

As shown in FIG. 5, a possible implementation manner of an embodiment of the present application provides a gesture-based interaction apparatus 500, comprising:

an information acquiring module 510, configured to acquire touch information corresponding to a touch event on a touch sensing surface; and a processing performing module 520, configured to: in response to that determining the touch event according to the touch information meets at least one set condition, perform an operation corresponding to the touch event, wherein the at least one set condition comprises: a first touch by a first finger on the touch sensing surface comprises a fingertip touch and a finger joint touch that occur in order.

According to an implementation manner of this embodiment of the present application, an operation intention of a user is identified by detecting a fingertip touch and a finger joint touch that occur in order and that are comprised in a touch by a finger of the user on a touch sensing surface, which enriches a manner for interacting with an electronic device having a touch sensing surface.

Modules and units of this embodiment of the present application are further described by using the following implementation manners.

In this embodiment, in response to a touch from a user, the touch sensing surface generates corresponding touch information, such as current information or voltage information.

In a possible implementation manner, optionally, the information acquiring module 510 may comprise a touch sensor corresponding to the touch sensing surface, to collect the touch information.

In another possible implementation manner, optionally, the information acquiring module 510 may comprise a communications module, to acquire the touch information from at least one external device.

In this embodiment of the present application, the first touch is a touch by the first finger on the touch sensing surface. In a process of the first touch, the first finger is basically in contact with the touch sensing surface all the time.

In this implementation manner, the fingertip touch is that a fingertip of the first finger comes into contact with the touch sensing surface. The finger joint touch is that a finger joint of the first finger comes into contact with the touch sensing surface.

In a possible implementation manner, optionally, the order comprises: the fingertip touch first occurs, and the finger joint touch then occurs.

In another possible implementation manner, optionally, the order comprises: the finger joint touch first occurs, and the fingertip touch then occurs.

It can be seen according to the foregoing descriptions that, in the foregoing implementation manners of this embodiment of the present invention, a gesture of a user is an action that can be naturally made by the user but that is generally not made through a misoperation. Therefore, this embodiment of the present application provides a natural man-machine interaction method with a low misoperation possibility.

A person skilled in the art may learn that, in this embodiment of the present application, any operation needed by a user may be defined according to the touch event. Several possible implementation manners are provided below.

Figure 6A:
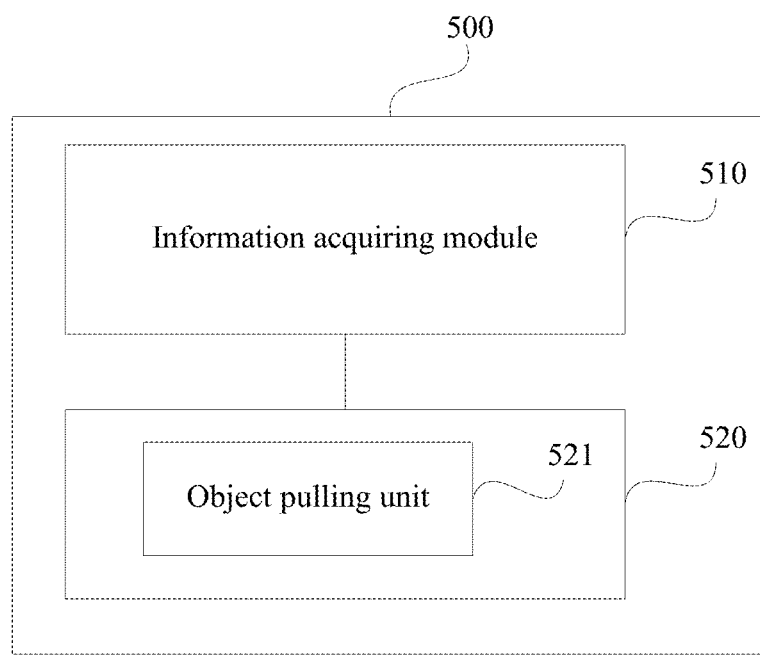
FIG. 6a to FIG. 6e are schematic block diagrams of structures of five interaction apparatuses according to an embodiment of the present application.

In a possible implementation manner, as shown in FIG. 6a, optionally, the processing performing module 520 comprises:

an object pulling unit 521, configured to: in response to that determining the touch event according to the touch information meets the at least one set condition, perform an operation of pulling an object having a pulling direction corresponding to a moving direction of the first touch.

In this implementation manner, the moving direction of the first touch is, for example, a moving direction of a touch track corresponding to the first touch.

In this implementation manner, the object may be an object, such as a menu, a page, or an icon, that can be pulled.

In a possible implementation manner, optionally, the object may be a preset object corresponding to the touch event.

Alternatively, in a possible implementation manner, the object may be determined according to information, for example, a touch location of the first touch. For example, in a possible implementation manner, the object may be determined according to an object corresponding to an initial touch location of the first touch.

In a possible implementation manner, the order comprises: the finger joint touch first occurs, and the fingertip touch then occurs.

Figure 6B:
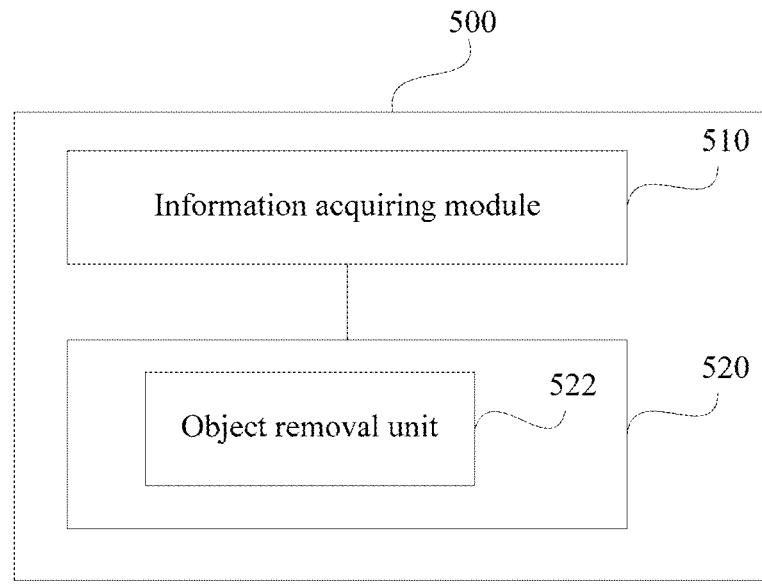

In this implementation manner, as shown in FIG. 6b, the processing performing module 520 comprises:

an object removal unit 522, configured to: in response to that determining the touch event according to the touch information meets the at least one set condition, perform an operation of removing an object having a removal direction corresponding to a moving direction of the first touch.

The object removal operation described herein may be, for example, removing an object from an object set, for example, removing a file in a folder from the folder; deleting information about a contact from a contact list; and the like. The object may be an object corresponding to the initial touch location of the first touch.

Compared with an operation, for example, of long pressing an object to select the object, and then dragging the object to move the object from a range of the object set, the object removal operation is more natural and more convenient.

It can be seen according to the foregoing descriptions that, in this embodiment of the present application, an object pulling operation and an object removal operation of removing an object are triggered by using the triggering event described above, which better complies with a natural usage habit of a user, is easy to operate, and is not easy to falsely trigger.

Certainly, a person skilled in the art may learn that only several possible operations corresponding to the triggering event are listed above, and according to a design requirement, another possible operation may also be applied to the implementation manners of the present application, and are not listed one by one herein.

It indicates by using the following implementation manners that multi-touch is applied to the interaction apparatus in this embodiment of the present application to trigger an application scenario of a corresponding operation.

Optionally, in a possible implementation manner, the at least one condition further comprises:

at least one second touch respectively by at least one second finger on the touch sensing surface exists, and the at least one second touch overlaps with the first touch in term of time.

The overlapping herein may be complete overlapping or may be partial overlapping. For example, the at least one second touch exists within a time between the fingertip touch and the finger joint touch of the first touch.

In the following implementation manners, an example in which the at least one second touch is a second touch is used for description.

In an implementation manner in which the order comprises: the fingertip touch first occurs, and the finger joint touch then occurs, the first touch and the second touch may correspond to an action of performing "twisting" by a user on the touch sensing surface by using a forefinger and a thumb.

In a possible implementation manner, it may be further determined according to a rotation track corresponding to the first touch that the first touch and the second touch correspond to the action of "twisting". Therefore, in this implementation manner, the at least one condition may further comprise:

the first touch corresponds to a first rotation track.

For example, a location at which the second finger is in contact with the touch sensing surface basically does not change, and the first finger performs the action of "twisting" by means of movement in a rotation radian.

Alternatively, further, the at least one condition may further comprise: the at least one second touch respectively corresponds to at least one second rotation track, wherein a rotation direction of the first rotation track is consistent with a rotation direction of the second rotation track.

In this implementation manner, the first finger and the second finger simultaneously rotate to one direction (for example, clockwise), to perform the action of "twisting".

A person skilled in the art may learn that according to settings, the touch event corresponding to the multi-touch described above may be used to trigger many operations.

Figure 6C:
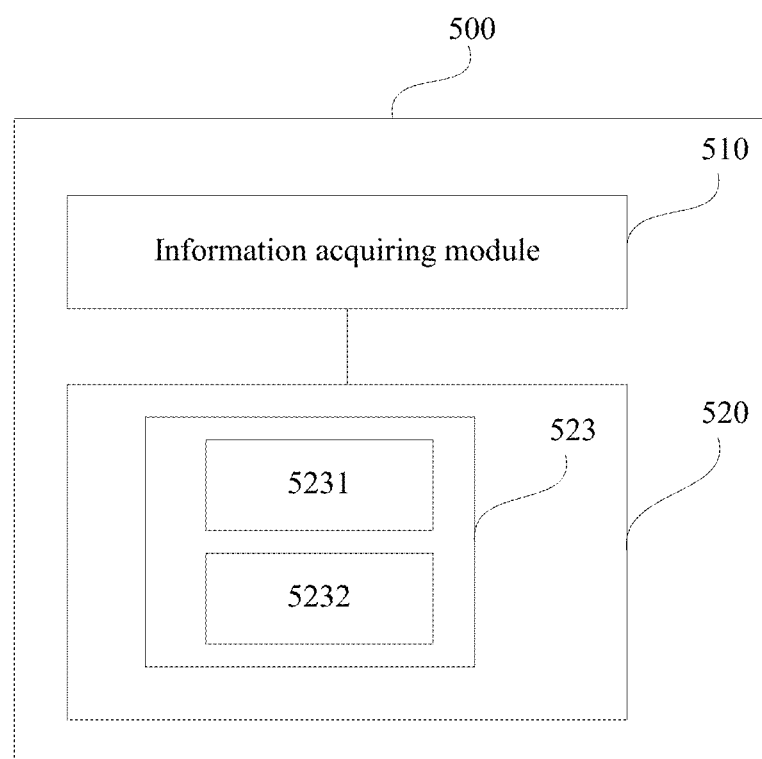

For example, in a possible implementation manner, as shown in FIG. 6c, optionally, the processing performing module 520 comprises:

an association unit 523, configured to: in response to that determining the touch event according to the touch information meets the at least one set condition, perform an operation of associating a first object corresponding to the first touch with at least one second object respectively corresponding to the at least one second touch.

In a possible implementation manner, optionally, the association unit 523 comprises:

a first object determining subunit 5231, configured to determine the first object according to an initial touch location of the first touch; and a second object determining subunit 5232, configured to respectively determine the at least one second object according to an initial touch location of the at least one second touch.

Certainly, in another possible implementation manner, a first object corresponding to the first touch and a second object corresponding to the second touch may be determined in a preset manner.

The operation of associating the first object with the second object may be any one of possible operations of associating two objects. For example, the operations of associating two objects may be:

1. data transmission between two objects, for example, data sharing between two applications corresponding to two icons and data sharing between two devices corresponding to two icons;

2. establishing a connection between two objects, for example, establishing a communication connection between two devices corresponding to two icons; and 3. classifying two objects into a same object set, for example, combining two icons into one icon folder.

Certainly, the operations of associating two objects may be further performed in another manner, which is not listed one by one herein again.

Because the action of "twisting" is generally performed by a user on an occasion in which multiple objects need to be aggregated together, using the touch event described above to perform the operation of associating multiple objects complies with a natural usage habit of the user, facilitating memorizing and use of the user.

In an implementation manner in which the order comprises: the finger joint touch first occurs, and the fingertip touch then occurs, the first touch and the second touch may correspond to an action of performing "reverse twisting" by a user on the touch sensing surface by using a forefinger and a thumb.

In this implementation manner, the at least one condition may further comprise: the first touch corresponds to a first rotation track.

For example, a location at which the second finger is in contact with the touch sensing surface basically does not change, and the first finger performs the action of "reverse twisting" by means of movement in a rotation radian.

Alternatively, further, the at least one condition may further comprise: the second touch separately corresponds to a second rotation track, wherein a rotation direction of the first rotation track is consistent with a rotation direction of the second rotation track.

In this implementation manner, the first finger and the second finger simultaneously rotate to one direction (the direction is generally opposite to the direction corresponding to the action of "twisting", for example, when the action of "twisting" is clockwise, the action of "reverse twisting" is anti-clockwise), to perform the action of "reverse twisting".

Figure 6D:
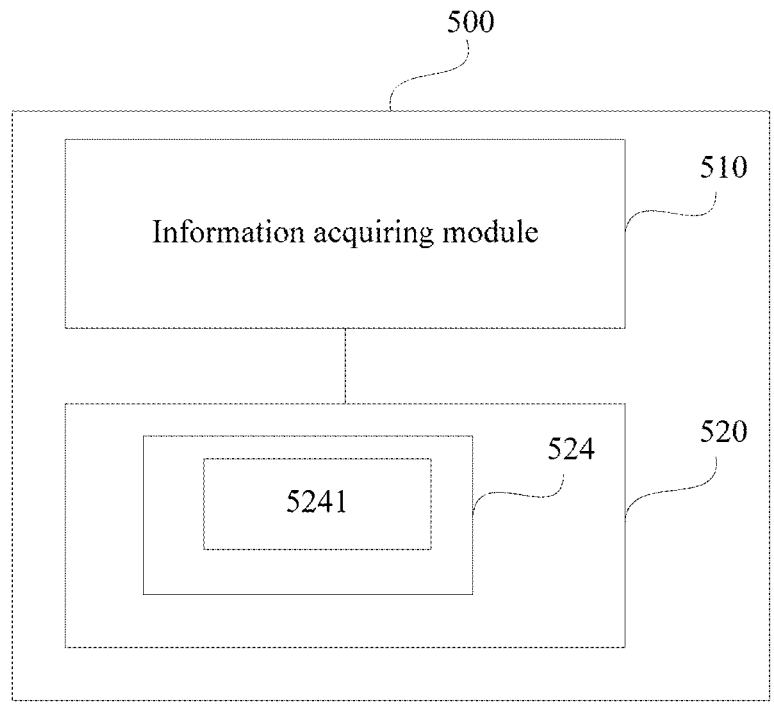

The action of "twisting" corresponds to the operation of associating two objects, and in a possible implementation manner, when the touch event corresponds to the foregoing action of "reverse twisting", as shown in FIG. 6d, the processing performing module 520 comprises:

a disassociation unit 524, configured to: in response to that determining the touch event according to the touch information meets the at least one set condition, perform an operation of disassociating at least two associated objects corresponding to the first touch and at least one of the at least one second touch.

In this implementation manner, the disassociation operation may correspond to the association of the at least two associated objects. For example, when the association is data transmission, the disassociation may be ending data transmission; when the association is establishing a connection, the disassociation may be disrupting a connection; when the association is combining multiple icons into a same icon folder, the disassociation may be de-aggregating the multiple icons in the icon folder.

In a possible implementation manner, optionally, the disassociation unit 524 comprises:

an object determining subunit 5241, configured to determine the at least two associated objects according to an initial touch location corresponding to a second touch of the at least one second touch.

For example, in a possible implementation manner, a first application is associated with a second application, a thumb of a user is initially placed on the first application or the second application, and the action of "reverse twisting" is then performed; therefore, an operation of disassociating the first application from the second application according to the touch event corresponding to the action of "reverse twisting".

Similarly, because the action of "reverse twisting" is generally performed by the user on an occasion in which multiple objects aggregated together need to be de-aggregated, using the touch event described above to perform the operation of de-associating multiple associated objects complies with a natural usage habit of the user, facilitating memorizing and use of the user.

Figure 6E:
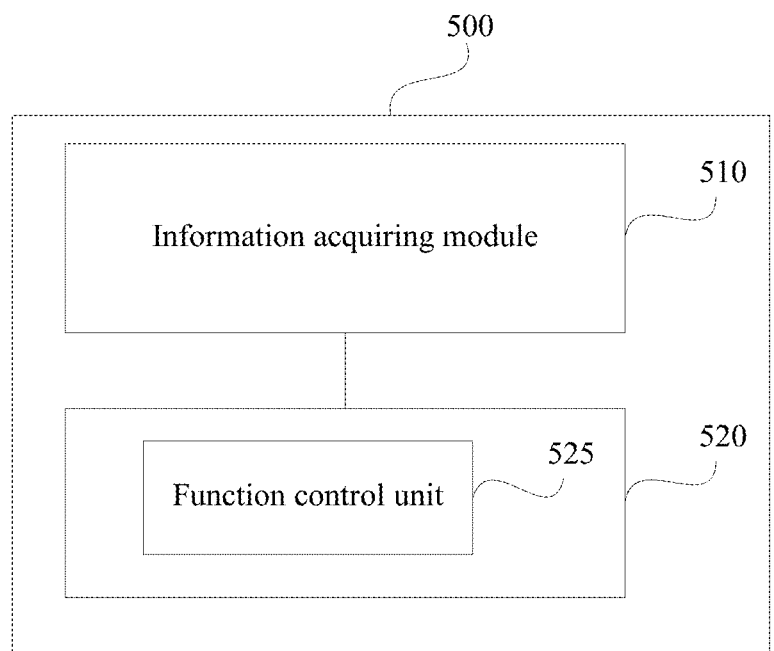

In a possible implementation manner, the action of "twisting" and the action of "reverse twisting" are also consistent with an action of twisting a knob. Therefore, in this implementation manner, optionally, as shown in FIG. 6e, the processing performing module 520 comprises:

a function control unit 525, configured to: in response to that determining the touch event according to the touch information meets the at least one set condition, perform an operation of enabling or disabling at least one function.

For example, the touch event corresponding to the action of "twisting" triggers an operation of enabling at least one function, and the touch event corresponding to the action of "reverse twisting" triggers an operation of disabling at least one function.

In a possible implementation manner, the at least one function may be determined according to presettings.

For example, the action of "twisting" is used on an icon of an application, which corresponds to an operation of enabling the application.

The action of "reverse twisting" is used on an interaction interface of an application, which corresponds to an operation of disabling the application.

Alternatively, the action of "twisting" or "reverse twisting" is used on any display interface of an electronic device, which corresponds to an operation of turning off the electronic device.

It may be seen according to the foregoing descriptions that using the touch event described above to perform the operation of enabling or disabling the at least one function also complies with a natural usage habit of the user, facilitating memorizing and use of the user.

A person skilled in the art may learn that some operations that can be triggered by touch events meeting at least one set condition in this embodiment of the present application are merely listed above exemplarily, and a touch event in this embodiment of the present application may be further used to trigger another possible operation. For example, because the action of "twisting" and the action of "reverse twisting" are consistent with an action of twisting a knob, the operation may be further an operation of adjusting a parameter. For example, the action of "twisting" corresponds to increasing a parameter (for example, volume), and the action of "reverse twisting" corresponds to reducing a parameter.

For further descriptions of functions of the modules and units in this embodiment of the present application, refer to the corresponding descriptions in the foregoing method embodiment.

Figure 7:
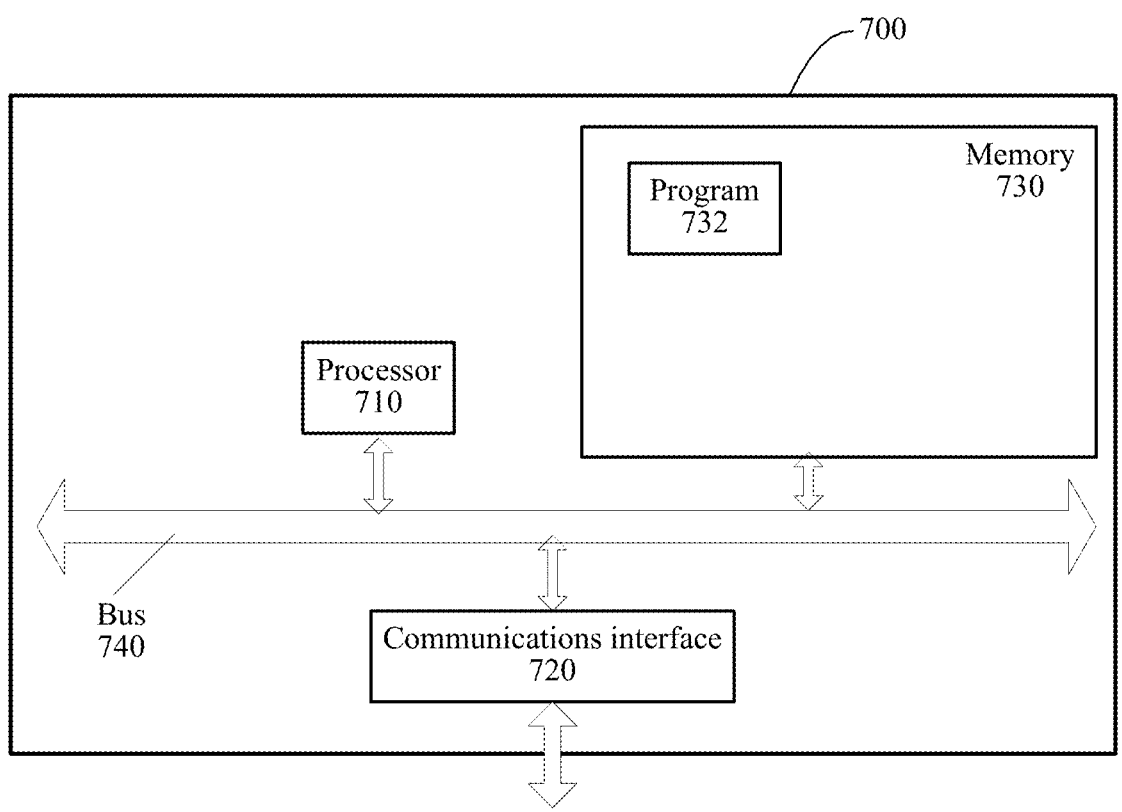
FIG. 7 is a schematic block diagram of a structure of a user equipment according to an embodiment of the present application.

FIG. 7 is a schematic structural diagram of a user equipment 700 provided in an embodiment of the present application. Specific implementation of the user equipment 700 is not limited in the specific embodiment of the present application. As shown in FIG. 7, the user equipment 700 may comprise:

a processor 710, a communications interface 720, a memory 730, and a communications bus 740.

The processor 710, the communications interface 720, and the memory 730 communicate with each other by using the communications bus 740.

The communications interface 720 is configured to communicate with a network element such as a client.

The processor 710 is configured to execute a program 732. Specifically, the processor 710 can perform relevant steps in the foregoing method embodiment.

Specifically, the program 732 may comprise program code, where the program code comprises a computer operation instruction.

The processor 710 may be a central processing unit (CPU), or an application specific integrated circuit (ASIC), or configured as one or more integrated circuits that implement the embodiments of the present application.

The memory 730 is configured to store a program 732. The memory 730 may comprise a high speed random access memory (RAM) memory, and may further comprise a non-volatile memory, for example, at least one magnetic disk storage. The program 732 may be specifically configured to enable the user equipment 700 to perform the following steps:

acquiring touch information corresponding to a touch event on a touch sensing surface; and in response to that determining the touch event according to the touch information meets at least one set condition, performing an operation corresponding to the touch event, wherein the at least one set condition comprises: a first touch by a first finger on the touch sensing surface comprises a fingertip touch and a finger joint touch that occur in order.

For specific implementation of the steps in the program 732, refer to the corresponding descriptions of corresponding steps and units in the foregoing embodiments, which are not described herein again. It may be clearly understood by a person skilled in the art that, for the purpose of convenient and brief description, for specific working procedures of the devices and modules that are described above, reference may be made to the descriptions of corresponding procedures in the foregoing method embodiment, and details are not described herein again.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the existing art, or all or a part of the technical solutions may be implemented in the form of a software product. The software product is stored in a storage medium and comprises several instructions for instructing a computer device (which may be a personal computer, a server, or a network device) or a processor to perform all or a part of the steps of the methods in the embodiments of the present application. The foregoing storage medium comprises: any medium that can store program code, such as a universal serial bus (USB) flash drive, a removable hard disk, a read-only memory (ROM), a random access memory (RAM), a magnetic disk, or an optical disc.

The above implementation manners are only used to describe the present application, rather than limit the present application; various alterations and variants can be further made by those of ordinary skill in the art without departing from the spirit and scope of the present application, so all equivalent technical solutions also belong to the scope of the present application, and the scope of patent protection of the present application should be defined by claims.

What is claimed is:

1. A gesture-based interaction method, comprising: acquiring touch information corresponding to a touch event on a touch sensing surface; and in response to that determining the touch event according to the touch information meets at least one set condition, performing an operation corresponding to the touch event, wherein the at least one set condition comprises: first touches by a first finger on the touch sensing surface, the first touches comprising a fingertip touch and a finger joint touch; and at least one second touch by at least one second finger on the touch sensing surface, the at least one second finger being different from the first finger, wherein the at least one second touch overlaps with the first touches at a time; wherein when a first order of the fingertip touch and the finger joint touch is that the fingertip touch occurs before the finger joint touch, the first touches and the at least one second touch correspond to performing a twisting action, wherein the first touches in the first order correspond to a first rotation track, and the at least one second touch corresponds to a second rotation track, wherein a rotation direction of the first rotation track is consistent with a rotation direction of the second rotation track, wherein the twisting action indicates that the operation comprises associating a first object corresponding to the first touches with at least one second object corresponding to the at least one second touch; and when a second order of the fingertip touch and the finger joint touch is that the finger joint touch occurs before the fingertip touch, the first touches and the at least one second touch correspond to performing a reverse twisting action, wherein the first touches in the second order correspond to a third rotation track, and a location of the at least one second touch does not chance, wherein the reverse twisting action indicates that the operation comprises disassociating at least two associated objects corresponding to the first touches and the at least one second touch.

2. The method of claim 1, further comprising:
determining the first object according to an initial touch location of the first touches; and
determining the at least one second object according to at least one initial touch location of the at least one second touch.

3. A user equipment, wherein the user equipment comprises: a memory storing a program; and a processor, configured to execute the program stored by the memory, wherein the program causes the processor to perform processes including: acquiring touch information corresponding to a touch event on a touch sensing surface; and in response to that determining the touch event according to the touch information meets at least one set condition, performing an operation corresponding to the touch event, wherein the at least one set condition comprises: first touches by a first finger on the touch sensing surface, the first touches comprising a fingertip touch and a finger joint touch; and at least one second touch by at least one second finger on the touch sensing surface, the at least one second finger being different from the first finger, wherein the at least one second touch overlaps with the first touches at a time; wherein When a first order is that the fingertip touch occurs before the finger joint touch, the first touches and the at least one second touch correspond to performing a twisting action, wherein the first touches in the first order correspond to a first rotation track, and the at least one second touch corresponds to a second rotation track, wherein a rotation direction of the first rotation track is consistent with a rotation direction of the second rotation track, wherein the twisting action indicates that the operation comprises associating a first object corresponding to the first touches with at least one second object corresponding to the at least one second touch; and when a second order is that the finger joint touch occurs before the fingertip touch, the first touches and the at least one second touch correspond to performing a reverse twisting action, wherein the first touches in the second order correspond to a third rotation track, and a location of the at least one second touch does not change, wherein the reverse twisting action indicates that the operation comprises disassociating at least two associated objects including the first object corresponding to the first touches and the at least one second object corresponding to the at least one second touch.

4. The equipment of claim 3, wherein the processes further comprise:
determining the first object according to an initial touch location of the first touches; and
determining the at least one second object according to an initial touch location of the at least one second touch.

5. The method of claim 1, wherein the first rotation track and the third rotation track indicate a movement track of the first finger.

6. The method of claim 1, wherein the second rotation track indicates a movement track of the at least one second finger.

7. The user equipment of claim 3, wherein the first rotation track and the third rotation track indicate a movement track of the first finger.

8. The user equipment of claim 3, wherein the second rotation track indicates a movement track of the at least one second finger.

* * * * *